UNITED STATES PATENT OFFICE.

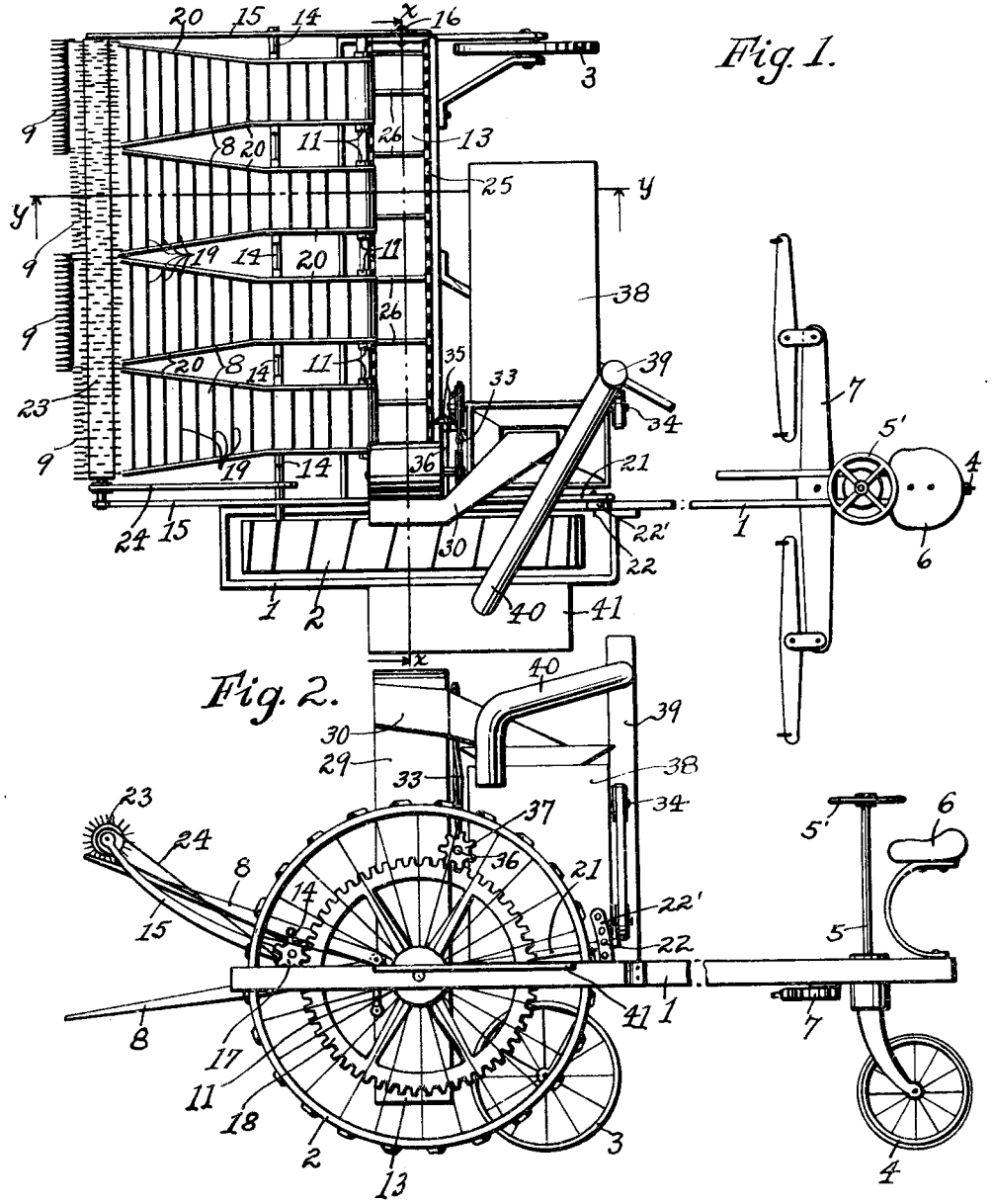

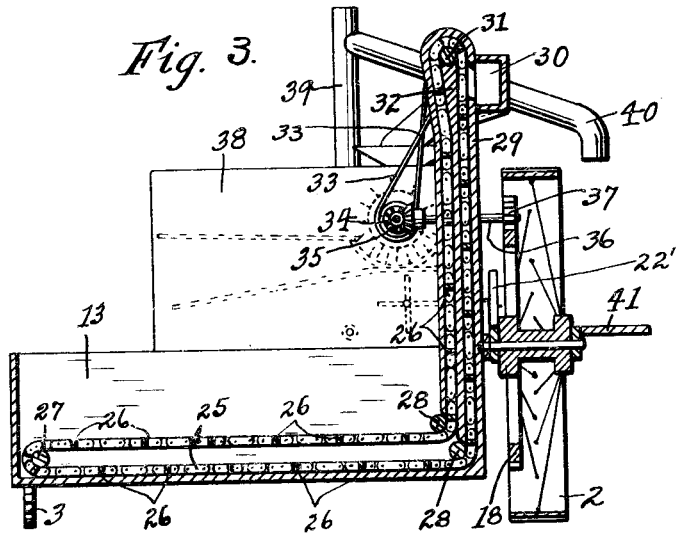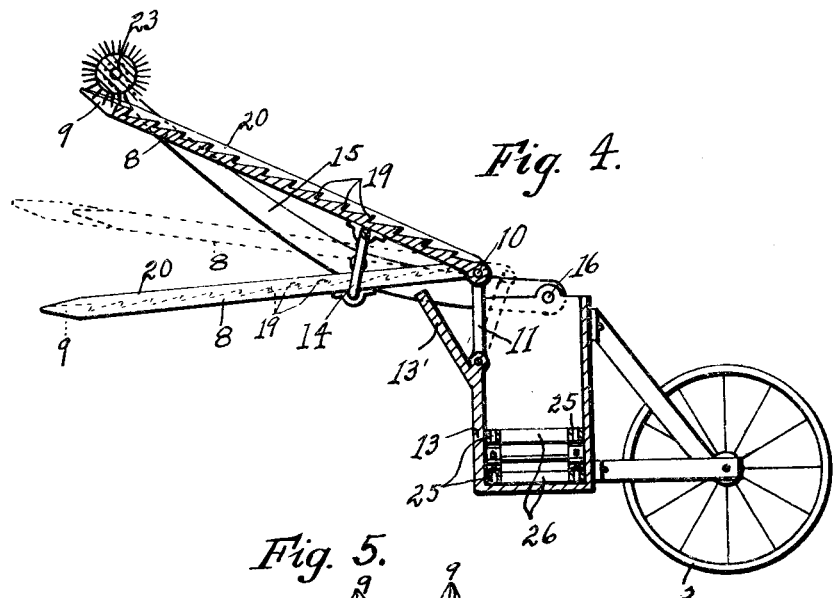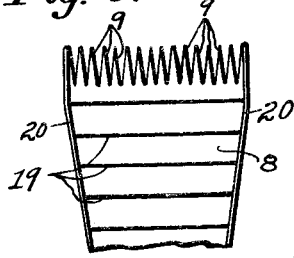

THOMAS DUGAN, OF CHICAGO, ILLINOIS.

HARVESTING-MACHINE.

1,127,971.  Specification of Letters Patent.  Patented Feb. 9, 1915.

Application filed February 28, 1913. Serial No. 751,244.

*To all whom it may concern:*

Be it known that I, THOMAS DUGAN, a citizen of the United States, and resident of the city of Chicago, county of Cook, and State of Illinois, have invented certain new and useful Improvements in Harvesting-Machines, of which the following is specification.

My invention relates to harvesting machines, and more specifically to that class thereof designed for use especially in the harvesting of grain.

The object of my invention is the production of a machine of the character mentioned through the medium of which the harvesting of grain or like material may be effected with ease and expedition and with the expenditure of a minimum of labor.

A further object is the production of a machine as mentioned which will be of durable and economical construction, and efficient in operation. Other objects will appear hereinafter.

With these objects in view, my invention consists in the combinations and arrangements of parts hereinafter described and claimed.

The invention will be best understood by reference to the accompanying drawings forming a part of this specification, and in which, Figure 1 is a top plan view of a harvesting machine embodying my invention, Fig. 2 is a side elevation thereof, Fig. 3 is a vertical transverse section taken substantially on line $x$—$x$ of Fig. 1, Fig. 4 is a slightly enlarged vertical longitudinal section taken on substantially line $y$—$y$ of Fig. 1, and Fig. 5 is a detail top plan view of the forward end of one of the comb-members included in the construction.

The preferred form of construction as illustrated in the drawings comprises a horizontally disposed frame 1 which is supported by wheels 2, 3 and 4. The wheel 4 which is arranged at the rearward end of the frame 1 is of the caster type, the same being mounted for oscillatory movement for employment in steering the machine. The wheel 4 is connected with a vertically extending shaft 5 at the upper end of which is provided a steering wheel 5' which is arranged in operative proximity with the driver's seat 6. With this arrangement it will be seen, that steering of the machine is readily effected by engagement of the steering wheel 5'. At the rearward end of the frame 1 is also arranged mechanism 7 in the form of whiffle-trees to which horses may be attached in order to propel the machine. It is understood, however, that if desired this form of propulsion may be dispensed with and a motor or other suitable or desired means employed for effecting propulsion of the machine.

Arranged at the front end of the frame 1 is a plurality of substantially horizontally disposed comb-members 8, the spaced teeth 9 of which are provided at the forward ends of said members, and so that in the operation of the machine said teeth will be brought into contact with the grain or other material which is being harvested. The rearward ends of the comb-members 8 are fulcrumed at 10 to the upper ends of links 11 which are fulcrumed at their lower ends to a transversely extending trough 13 which is supported in the frame. By thus fulcruming the members 8 it will be seen that horizontal movement thereof as well as oscillatory movement in a vertical plane will be permitted. Actuation of the comb-members 8 is effected through the medium of a crank shaft 14 the respective ends of which are journaled in bearings arms 15 the rearward ends of which are fulcrumed at 16 to the opposite ends of the trough 13. The shaft 14 is provided with a plurality of alternating cranks to which the members 8 are connected intermediate their extremities, the arrangement being such, that upon rotation of the shaft 14 a compound oscillatory and circular movement or a compound vertical and horizontal movement will be imparted to said comb-members, hence the reason for connecting the rearward ends of said comb-members with the pivoted links 11. Rotation of the shaft 14 for causing actuation of the comb-members 8 is effected through the medium of a pinion 17 provided at one end of the shaft 14 which meshes with a gear 18 carried by the traction wheel 2. The upper sides of the comb-members 8 are provided with transversely extending corrugations or teeth 19 whereby, in the operation of the machine when said comb-members are actuated, as above mentioned, the grain or material gathered thereby will be prevented from sliding forwardly upon the members 8, the same being permitted only to travel rearwardly toward the trough 13, as will be readily understood. The adjacent side 13' of said trough is angularly disposed, as shown, in order to insure the deposit of the grain into the trough which is discharged from the rearward ends of said comb members. Also the lateral or longitudinal edges of said comb-members are provided with upwardly extending flanges 20 for preventing the material which is gathered thereon from dropping over the lateral edges of said comb-members.

The pivotal points 16 of the bearing members 15 which carry the crank shaft 14 are in axial alinement with the gear 18, this arrangement permitting of the bearing arms 15 being rockingly adjusted without effecting disengagement of the pinion 17 from the driving gear 18. Such adjustment of the bearing arms 15 is desirous in order to alter the vertical position of the forward or operative ends of the comb-members 8 so as to adapt the latter for use in the harvesting of crops of various heights, that is crops in which the stalks are of various lengths. This provision is evidently of importance inasmuch as the growth of the crop is governed by a multitude of conditions and necessarily varies from year to year or varies in different localities. The present machine is therefore designed to be applicable in all cases. With this end in view one of the bearing arms 15 is provided with a rearward extension 21 whereby the vertical positions of the forward ends of the comb-members 8 may be adjusted through oscillation of said extension. The rearward end of said extension 21 is releasably connected through the medium of a pin 22 with a perforated segmental bar or plate 22'. The pin 21 is adapted for engagement with any one of the perforations in the member 22' and so that when it is desired to vertically adjust the forward ends of the comb-members 8 it is only necessary to remove the pin 22 and after the desired adjustment of the extension 21 insert said pin in the adjacent perforation in the member 22', said pin serving to releasably lock said extension and hence the comb-members 8 in positions of adjustment. Coöperating with the teeth 9 of the comb-members 8 is a rotary brush 23 which is carried at the forward ends of the bearing arms 15, said brush, during operation of the machine, being continually rotated through the medium of a belt 24 which passes around coplanar pulleys provided upon the shaft of said brush and the crank shaft 14. The brush 23 is so positioned that the teeth 9 of the comb-members 8 will contact with the under side thereof when the forward ends of the latter are at their upper terminals of movement, said brush being adapted to effect the cleaning of said teeth, causing the removal of any grain or material which may be lodged between the teeth 9. Said brush will be rotated in such a direction that the material removed or dislodged thereby will be directed rearwardly upon the comb-members 8. Said brush being carried by the bearing arms 15 will move in unison with the comb-members 8 upon vertical adjustment thereof as above set forth.

Provided at the bottom of the trough 13 is an endless conveyer consisting of a pair of endless sprocket chains 25 to which are secured transversely extending spaced strips or slats 26, as clearly shown in Figs. 3 and 4. The chains 25 pass around a guide roller 27 provided at one end of the trough 13, and under guide rollers 28 provided at the other end of said trough, the guide rollers 28 directing said chains 25 upwardly into a vertically disposed elevator casing or housing 29. The grain or material which is deposited into the trough 13 will be conveyed, as will be understood, by the conveying mechanism described, toward one end of the trough 13 and thence upwardly into housing 29, being discharged from the upper end of the latter into an inclined chute or conduit 30. At the upper end of the casing or housing 29 is provided a roller 31 around which the conveyer travels, a medial partition 32 being provided in the housing 29 in order to form compartments between adjacent strips or slats 26 when the latter travel upwardly in the elevating operation. Driving of this conveying and elevating mechanism is effected by means of a twisted belt 33 which passes around coplanar pulleys provided one upon the shaft or roller 31 and the other upon a shaft 34. The shaft 34 is connected through meshing bevel gears 35 with a shaft 36 which is driven by the gear 18 through the medium of a pinion 37 carried by said shaft and which meshes with said gear 18, as clearly shown in Figs. 2 and 3.

The material deposited into the chute or conduit 30 passes down the latter by gravity and is discharged therefrom into a separator or threshing element 38 which may be of any ordinary or preferred design, said separator being driven by the shaft 34. The element 38 effects the separation of the grain from the chaff, the chaff being blown therefrom in the ordinary manner and the cleaned grain discharged into the base of suitable elevating mechanism 39 whence said cleaned grain is deposited into chute 40 which leads to a suitable platform 41 secured to the frame 1, where the grain will be deposited into bags or other receptacles in charge of a man stationed upon said platform.

In use, the machine is driven forwardly into the standing crop which it is desired to harvest, the comb-members 8 having been previously vertically adjusted to correspond with the height of the stalks of the crop. In this operation the toothed ends of the comb-members 8 will be forced into contact with the upper ends of the stalks of the standing crop, the teeth of said comb-members upon actuation of the latter as above set forth, effecting the stripping or snapping of the heads of the stalks from the latter. The material so gathered by the comb-members will travel rearwardly upon the latter, and be deposited into the trough 13 whence the same is conveyed, as above described, to the separating mechanism and finally the cleaned grain discharged into sacks arranged upon the platform 41. Thus the harvesting and threshing of the grain is effected in one operation or in one handling, effecting a great saving in time and labor.

The forward ends of the comb-members 8 are disposed so as to overlap slightly in order to insure against some of the stalks of the crop being left untouched in the travel of the machine therethrough. This overlapping as mentioned is made possible through the reduction of the width of the rearward ends of said comb-members, and the connection of the latter with the crank shaft 14 eccentrically or in such a manner that adjacent comb-members will alternate in operating movement.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A grain harvesting machine comprising a wheeled frame; a comb-member mounted in said frame for oscillatory movement entirely above the ground, the amplitude of oscillation of said member being comparatively great whereby said member is adapted, in operation, to strip or snap the heads of the grain stalks from the latter; and means for actuating said comb-member, substantially as described.

2. A grain harvesting machine comprising a wheeled frame; a substantially horizontally disposed member mounted in said frame for oscillatory movement entirely above the ground, one end of said member having spaced engaging teeth the amplitude of oscillation of said member being comparatively great whereby said member, upon oscillation thereof, is adapted to strip or snap the heads of the grain stalks from the latter; and means for actuating said toothed member, substantially as described.

3. A grain harvesting machine comprising a wheeled frame; a substantially horizontally disposed member movably mounted in said frame; spaced teeth provided at the front end of said member; means for actuating said member to impart a compound horizontal and vertical movement thereto; and means on said member for guiding rearwardly material gathered by said teeth when the machine is in operation, substantially as described.

4. A grain harvesting machine comprising a wheeled frame; a substantially horizontally disposed member movably mounted in said frame; spaced teeth provided at the front end of said member; means for actuating said member to impart a compound horizontal and vertical movement thereto; and a channel formed at the upper side of said member for guiding rearwardly material gathered by said teeth when the machine is in operation, substantially as described.

5. A grain harvesting machine comprising a wheeled frame; a substantially horizontally disposed member movably mounted in said frame; spaced teeth provided at the front end of said member; means for actuating said member to impart a compound horizontal and vertical movement thereto; and a channel formed at the upper side of said member for guiding rearwardly material gathered by said teeth when the machine is in operation, the bottom of said channel being transversely corrugated, substantially as described.

6. A grain harvesting machine comprising a wheeled frame; a substantially horizontally disposed member mounted in said frame for movement above the surface of the ground; spaced teeth provided at the front end of said member; means for actuating said member to impart a compound horizontal and vertical movement thereto; and cleaning means coöperating with said teeth for removing material lodging therebetween and directing the same toward the rearward end of said member, substantially as described.

7. A grain harvesting machine comprising a wheeled frame; a substantially horizontally disposed member mounted in said frame for movement above the surface of the ground; spaced teeth provided at the front end of said member; means for actuating said member to impart a compound horizontal and vertical movement thereto; and a rotary cleaning brush coöperating with said teeth for removing material lodging therebetween and directing the same toward the rearward end of said member, substantially as described.

8. A grain harvesting machine comprising a wheeled frame; a substantially horizontally disposed member mounted in said frame for movement above the surface of the ground; spaced teeth provided at the front end of said member; means for actuating said member to impart a compound horizontal and vertical movement thereto; a rotary cleaning brush coöperating with said teeth for removing material lodging therebetween and directing the same toward the rearward end of said member; and means for rotating said cleaning brush, substantially as described.

9. A grain harvesting machine comprising a wheeled frame; a substantially horizontally disposed member mounted in said frame for movement above the surface of the ground; spaced teeth provided at the front end of said member; means for actuating said member to impart a compound horizontal and vertical movement thereto; cleaning means coöperating with said teeth for removing material lodging therebetween and directing the same toward the rearward end of said member, the toothed end of said member and said cleaning means being adapted for unisonous vertical adjustment; and means for vertically adjusting said end of said member and said cleaning means and for retaining the same in positions of adjustment, substantially as described.

10. A grain harvesting machine comprising a wheeled frame; a substantially horizontally disposed member movably mounted in said frame; spaced teeth provided at the front end of said member; means for actuating said member to impart a compound horizontal and vertical movement thereto; means for guiding rearwardly material gathered by said teeth when the machine is in operation; and cleaning means coöperating with said teeth for removing material lodging therebetween and directing the same rearwardly toward said guiding means, substantially as described.

11. A grain harvesting machine comprising a wheeled frame; a substantially horizontally disposed member movably mounted in said frame; spaced teeth provided at the front end of said member; means for actuating said member to impart a compound horizontal and vertical movement thereto; a channel formed at the upper side of said member for guiding rearwardly material gathered by said teeth when the machine is in operation; and cleaning means coöperating with said teeth for removing material lodging therebetween and directing the same rearwardly toward said channel, substantially as described.

In testimony whereof I have signed my name to this specification in the presence of two subscribing witnesses.

THOMAS DUGAN.

Witnesses:
JOSHUA R. H. POTTS,
HELEN F. LILLIS.

Copies of this patent may be obtained for five cents each, by addressing the "Commissioner of Patents, Washington, D. C."